(12) United States Patent
Hinsperger

(10) Patent No.: US 6,279,986 B1
(45) Date of Patent: Aug. 28, 2001

(54) LAWN TRACTOR PERSONAL ENCLOSURE

(75) Inventor: Peter Hinsperger, Mississauga (CA)

(73) Assignee: Hinspergers Poly Industries Ltd., Ontario (CA)

( * ) Notice: Subject to any disclaimer, the term of this patent is extended or adjusted under 35 U.S.C. 154(b) by 0 days.

(21) Appl. No.: 09/619,638

(22) Filed: Jul. 19, 2000

(30) Foreign Application Priority Data

Jul. 28, 1999 (CA) .................................................... 2279137

(51) Int. Cl.⁷ .................................................... B62D 26/06
(52) U.S. Cl. .......................................... 296/102; 296/77.1
(58) Field of Search ................................... 296/102, 77.1

(56) References Cited

U.S. PATENT DOCUMENTS

| | | | | |
|---|---|---|---|---|
| 639,890 | * | 12/1899 | Delaney | 296/102 |
| 2,631,057 | | 3/1953 | Weaklend . | |
| 2,705,169 | | 3/1955 | Williams . | |
| 3,227,484 | * | 1/1966 | Merclean | 296/77.1 |
| 3,333,888 | | 8/1967 | Williams et al. . | |
| 3,610,677 | * | 10/1971 | Hawley | 296/102 |
| 3,709,553 | * | 1/1973 | Churchill et al. | 296/77.1 |
| 3,799,608 | | 3/1974 | Smutny et al. . | |
| 3,834,756 | | 9/1974 | Grell . | |
| 3,841,430 | * | 10/1974 | Babitt, Jr. et al. | 296/102 |
| 4,098,536 | * | 7/1978 | Mills | 296/77.1 |
| 4,332,415 | | 6/1982 | Williams . | |
| 4,389,057 | * | 6/1983 | Richard | 296/78 |
| 4,643,479 | | 2/1987 | Servi . | |
| 4,846,524 | | 7/1989 | Gerber . | |
| 4,940,280 | * | 7/1990 | Templeton | 296/102 |
| 5,184,865 | * | 2/1993 | Mohtasham et al. | 296/77.1 |
| 5,203,601 | * | 4/1993 | Guillot | 296/77.1 |
| 5,286,081 | * | 2/1994 | Martin | 296/102 |
| 5,310,235 | * | 5/1994 | Seymour et al. | 296/77.1 |
| 5,393,118 | * | 2/1995 | Welborn | 296/77.1 |

FOREIGN PATENT DOCUMENTS

1162271 * 4/1958 (FR) .................................................... 296/102

* cited by examiner

*Primary Examiner*—Joseph D. Pape
*Assistant Examiner*—Kiran B. Patel
(74) *Attorney, Agent, or Firm*—McFadden, Fincham

(57) ABSTRACT

A lawn or yard tractor personal enclosure has a frame supported on the tractor, conveniently by attachment to a seat mounting position. The enclosure has a top frame, back supports and support members attaching the supports to the tractor. A flexible enclosure, for example of netting, fits over the frame and is contoured to suit the tractor. L-shaped brackets at the lower ends of the back supports include quick release mounts to releasably attach the enclosure to a tractor.

13 Claims, 5 Drawing Sheets

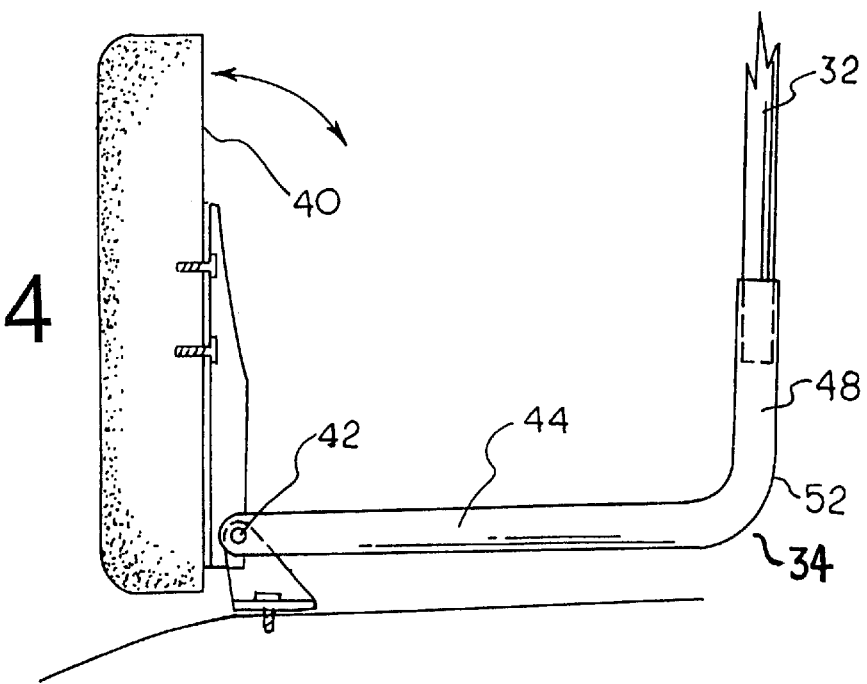
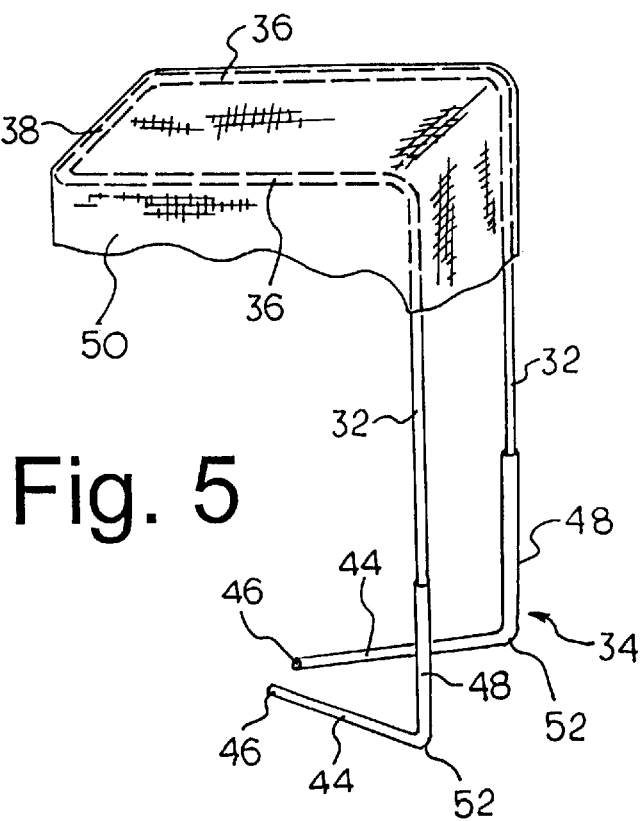

LAWN TRACTOR PERSONAL ENCLOSURE

FIELD OF THE INVENTION

This invention relates to a protected personal enclosure for a yard tractor or the like.

BACKGROUND OF THE INVENTION

Current yard tractors and the like are open to the elements. At best they are equipped with a shade that provides some protection against the suns rays for the occupant of the tractor. Such a sun shade however does not provide any protection against air borne dust, pollen and other allergens, insects, and particles that may be kicked up by the tractor during yard cutting. There is therefore a need for protective enclosure which would protect the operator of the tractor against these air borne elements. There is also a need to provide a means to easily install and remove such an enclosure on a tractor, without requiring any modification, drilling or cutting or any of the tractor components. As well, attachment means should be able to mount the enclosure on virtually any lawn tractor.

SUMMARY OF THE INVENTION

An object of the invention is to provide an improved enclosure for a yard tractor or the like, to protect an operator from insects and other airborne objects. It is a further object to provide an enclosure which may be easily fastened to a variety of commercially available lawn tractors without drilling or other permanent modifications of the tractor.

In one aspect of the invention, a protective personal enclosure for a yard tractor or the like comprises an enclosure having a substantially rigid upper frame, a vertically oriented frame spacing the upper frame from the tractor, a protective material disposed over the upper frame and extending downwardly and means to secure the protective material to the tractor and/or the upper frame and/or the vertically oriented frame.

In another aspect, the vertically oriented frame includes means for releasably securing the enclosure to a tractor. The securing means comprises a hook means for engagement with a component of the tractor and a retractable fastening means for fastening the hook means to the lower frame of the enclosure. The hook means may be initially loosely engaged with a component of the tractor and then tightly fastened to the tractor component by retracting the hook means against the vertically oriented frame via the retraction means. In one version, the retraction means comprises a threaded rod fastened to the hook means and extending through an aperture within the vertically oriented frame. A nut or other internally threaded member on the threaded rod tightens the hook means against the frame.

Having thus generally described the invention, reference will now be made to the accompanying drawings illustrating the preferred embodiments.

BRIEF DESCRIPTION OF THE DRAWINGS

FIG. 4 is a side view showing the frame attachment to the tractor;

FIG. 5 is an isometric view of the frame showing FIG. 2, with a sun shield installed;

DETAILED DESCRIPTION OF THE PREFERRED EMBODIMENTS

Figure 1:
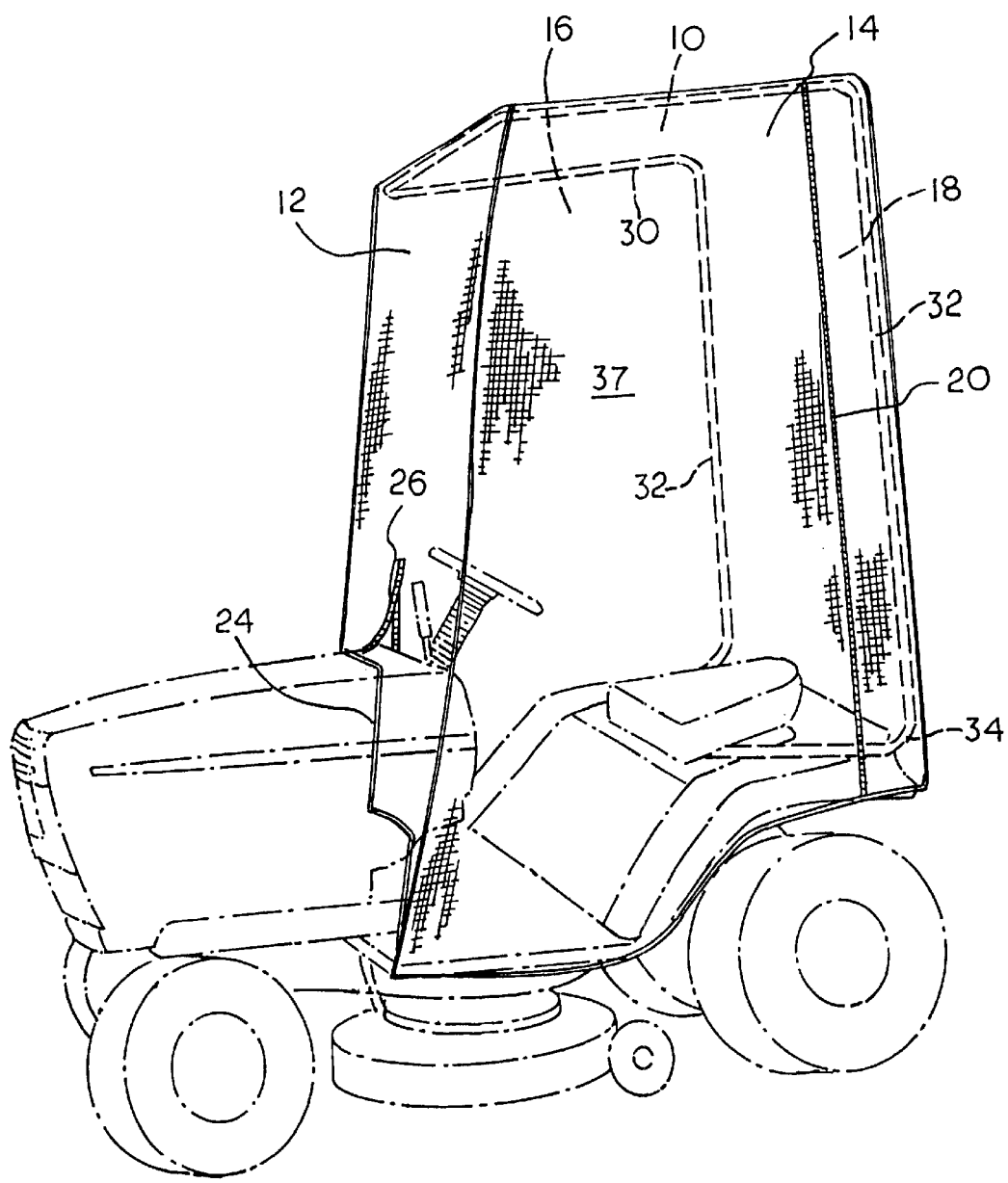
FIG. 1 is an isometric view of the protective enclosure of the present invention, with the tractor shown in dotted outline.
Figure 6:
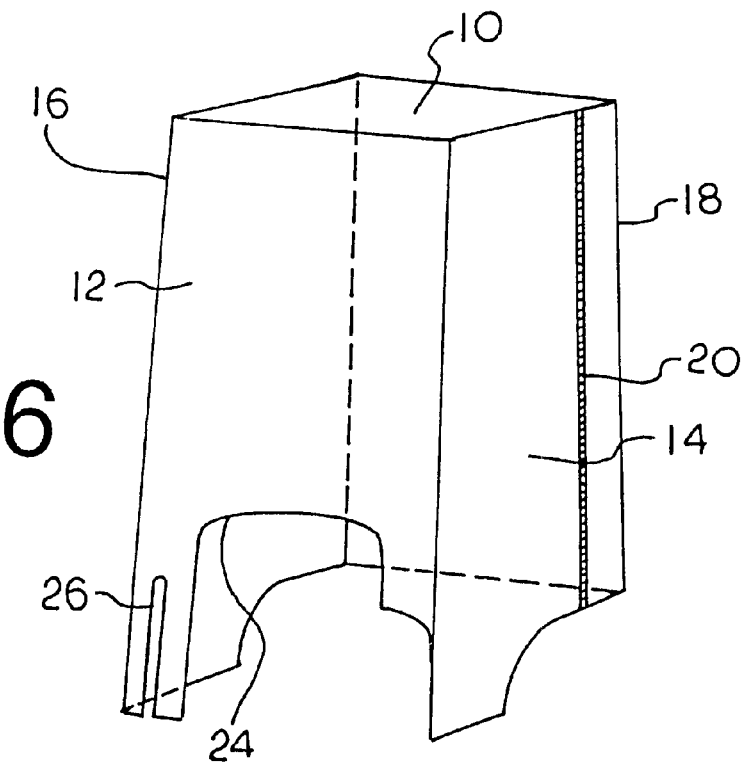
FIG. 6 is a perspective view of the enclosure, showing shaping for access to controls.

Referring now to the drawings, the protective enclosure of the present invention and particularly to FIGS. 1 and 6, the enclosure includes a rectangular top panel 10 and four panels 12, 14, 16 and 18, comprising front panel 12, left panel 14, right panel 16 and back panel 18. The panels 12, 14, 16 and 18 together with the top panel 10, define a rectangular box like enclosure having an open bottom. The panels of the enclosure can be made of netting or any other flexible material suitable for preventing the passage of air borne elements such as dust. A zippered opening 20 is included in the side left panel 18 corresponding to the driver's side of the tractor, for entry and exit of the driver. The front panel 12 is designed to contact the hood of the tractor and contains a cut-away portion 24 which is designed to fit the contour of the hood of the tractor. To the left of the cut-away portion as one faces the front panel is a slit 26 which is designed to allow the passage of the tractor's gear shift lever. The slit 26 can be closed by overlapping a slit panel 27 with the front panel 12. The slit may be closed by suitable closure means.

Figure 2:
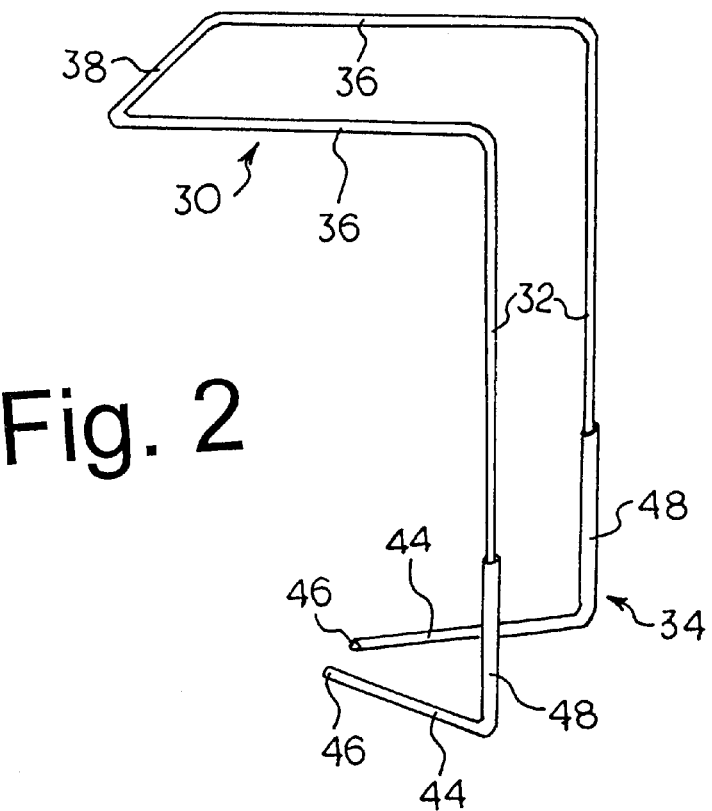
FIG. 2 is an isometric view of the frame for the protective cover of the present invention.

In use the enclosure is disposed on a frame attached to the tractor. The frame is seen in dotted outline in FIG. 1 and also clear in FIG. 2. The frame comprises a substantially rigid upper frame 30 in the form of a U-shaped element held above the tractor by two supports 32. Supports 32 in turn are attached to the rear of the tractor seat. The upper frame 30 includes two spaced top sections 36 to extend forwardly from the upper ends of supports 32 and a cross member 38 joining the forward ends of the top sections 36.

When disposed over the frame the enclosure's top panel rests on the upper frame while the side panels extend downwardly to the tractor. Securing means such as velcro is used to removably secure the enclosure netting 37 to the upper frame and as well to secure the bottom edges of the side panels to the tractor body. Other suitable securing means such as snaps can be used. The securing of the netting to both the upper frame and the tractor prevents the netting from being blown away from the body of the tractor thus exposing the operator to the elements.

Figure 3:
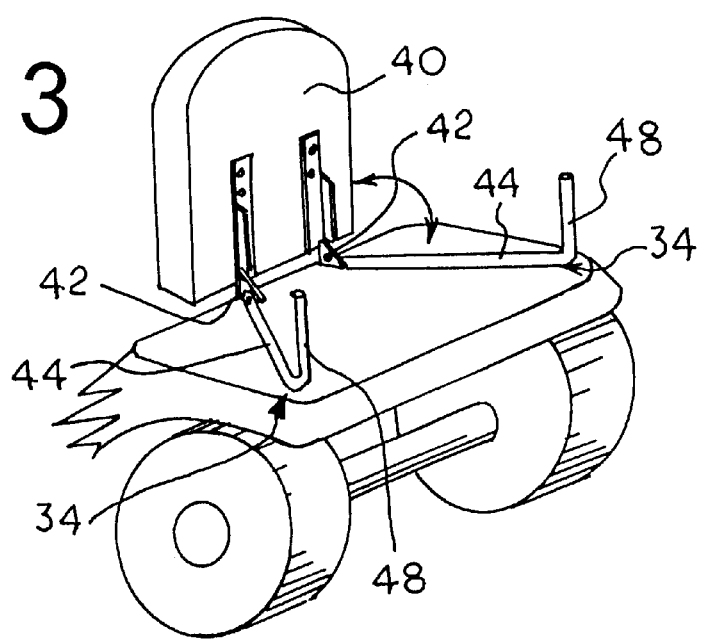
FIG. 3 is a perspective view showing the frame attachment to the tractor.

FIGS. 3 and 4 illustrate one form of attachment of the enclosure frame to a tractor. Tractors usually have a pivoted or tip-up seat 40, pivotally attached to the tractor frame by pivots 42. The supports 32 are L-shaped with forward extending sections 44 having at their forward ends holes 46 (see FIG. 2). The pivots 42, which may be bolts and nuts or pins with cotter pins for example, are unfastened and then repositioned to attach the forward ends of sections 44, and the seat, to the tractor. With the seat pivoted back into position, and with the driver positioned on the seat 40, the enclosure frame will be held firmly in position. The L-shaped supports also have upwardly extending sections 48 to which the lower ends of supports 32 are connected.

Figure 7:
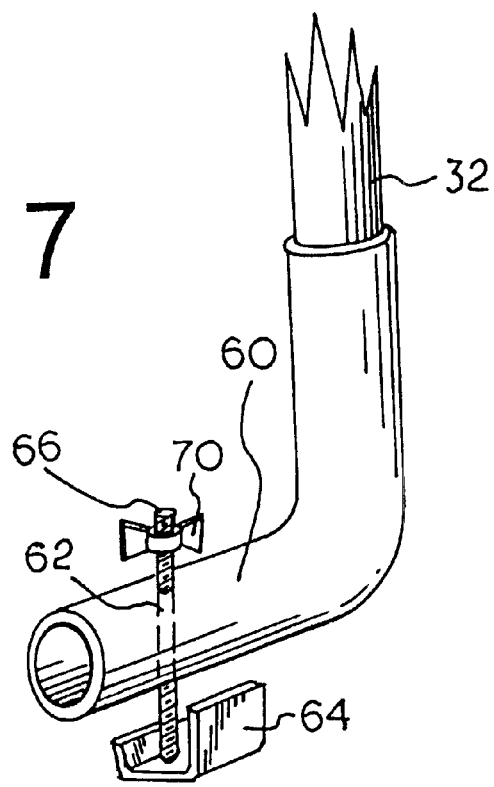
FIG. 7 is a perspective view of a portion of a frame, showing a retaining hook.
Figure 8:
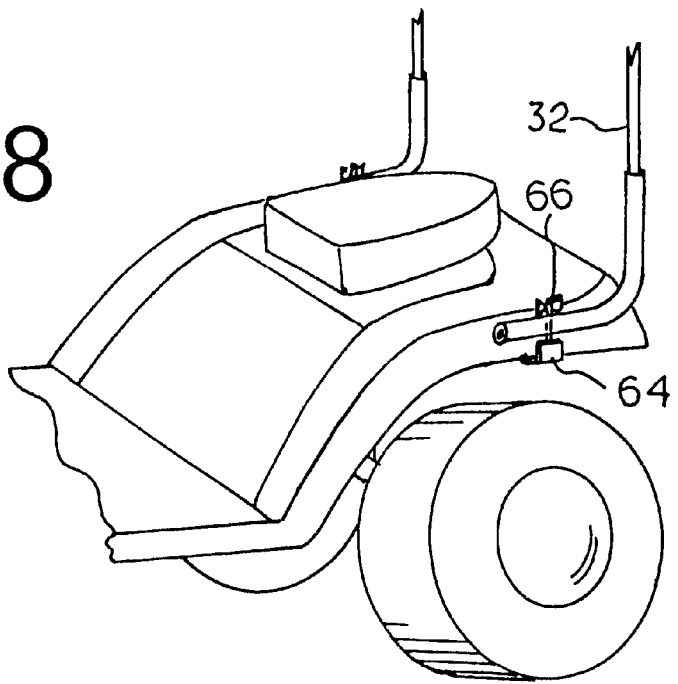
FIG. 8 shows the embodiment of FIG. 7, engaged to a lawn tractor fender.

In another embodiment, seen in FIGS. 7 and 8, releasable retainer means are provided to fasten the frame to the tractor in a manner in which the frame may be easily released. In this version, the supports 32 are comprised of elongate generally vertical members, each of which is generally L-shaped and terminates at its lower end with a generally horizontally foot portion 60. An aperture 62 extends through the foot 60, the axis which is generally vertical. A broad hook 64, formed from a metal plate having a generally fish hook shaped profile, is provided, with a threaded rod 66 extending from the upper region from the hook 64. The threaded rod 66 extends through the aperture 62, and is engaged to a corresponding support 32 by ways of a wing nut 70 or other internally threaded member. Tightening of the nut 70 draws the hook upwardly against the frame. The hook is preferably coated with a plastic or other like protective coating, both to prevent rusting and to minimize scratching or damage to the tractor. In use, the hook may be tightened against a convenient part of the tractor, such as the rear fender or wheel cowling. The nut 70 is then tightened sufficiently to firmly fasten the frame to the tractor.

The hook fastening means shown in FIG. 7, may also be used in combination with fastening means shown in FIGS. 3 and 4. This provides a enclosure frame which is capable being fastened either to a tractor having specific modifications to receive the enclosure frame, or to a tractor having no such modifications.

In addition to the enclosure, a sun shade can also be fitted. This is illustrated in FIG. 5. The sun shade 50 fits over the upper part of the upper frame, resting on the sections 36 and 38. The sun shade, if provided, is positioned over the frame before adding the enclosure comprising panels 10, 12, 14, 16 and 18.

In the example illustrated in the drawings, the sections 34 fit into the supports 32, as for example a sliding fit. While the rest of the frame is shown as an unitary member, it can be formed on separate sections which join together, as by sliding joints. For example the sections 36 can be attached to sections 34 by sliding joints at corners 52. Similarly the sections 38 can be joined to the sections 36. Also the supports 32 can be in more than one piece, for convenience in packing.

The enclosure can be supplied as a complete frame ready for attachment to a tractor, the flexible material then applied over the frame. As an alternative the frame for the enclosure can be in the form of separate sections or members adapted to be joined together prior to attachment to a tractor, by, for example, a purchaser. In such case the disassembled enclosure, with the flexible material, can be supplied in a container. A sun shield can be included or supplied as a separate item. The sections or members can be joined by interengaging sliding joints, or by any other convenient method.

I claim:

1. A lawn tractor personal enclosure comprising:
    a substantially frigid frame for mounting to a lawn tractor, said frame having sides, a front end and a rear end and comprising an upper generally horizontal frame portion and first and second spaced apart generally vertical supports each having upper and lower ends, said vertical supports being positioned on either side of said frame joined at an upper end to said upper frame portion;
    each of said vertical supports terminating at its lower end in an L-shaped bracket comprising an upright portion and a horizontal portion for resting on said tractor;
    quick-release mount means for releasably attaching said vertical supports to said tractor; and
    a flexible protective enclosure for fitting to said frame, for support by said frame.

2. An enclosure as defined in claim 1, wherein said L-shaped backets each include mount means for being fixedly joined to said tractor and said quick-release mount means are between said L-shaped bracket and said vertical supports.

3. An enclosure as defined in claim 2, wherein said quick-release mount means comprises one of said upright portion and the lower end of said vertical support comprising a sleeve and the other of said upright portion and vertical support for fitting within said sleeve.

4. An enclosure as defined in claim 2, wherein said horizontal portion includes an attachment member for fastening to an undercarriage of a tractor seat.

5. An enclosure as defined in claim 1, wherein each of said horizontal portions includes releasable mount means for releasably fastening said L-shaped bracket to said tractor.

6. An enclosure as defined in claim 5, wherein said releasable mount means comprises a hook means for releasably engaging a portion of said tractor, and retraction means to tighten said hook against said portion of said tractor.

7. An enclosure as defined in claim 6, wherein said retraction means comprises a threaded rod having an effective length between said horizontal portion and said hook means, and tightening means for effectively reducing said effective portion thereby tightening said hook means against said tractor.

8. An enclosure as defined in claim 1, comprising essentially first and second generally vertical supports joined to a rear portion of said upper frame.

9. A method for mounting a personal enclosure to a lawn tractor, comprising the steps of:
    providing a substantially rigid frame, said frame comprising a generally horizontal upper frame portion, first and second spaced apart generally vertical supports joined to said upper frame portion, each vertical support terminating at its lower end in an L-shaped bracket and quick release fastening means for connecting said vertical supports to said tractor;
    releasably fastening said frame to said lawn tractor with said fastening means, including supporting a portion of said L-shaped bracket on said tractor;
    supporting a flexible protective enclosure with said rigid frame.

10. A method as defined in claim 9, wherein said L-shaped brackets are each for fixedly mounting to said tractor, and are each for releasably attaching said generally vertical supports, said method comprising the further steps of fixably mounting each of said L-shaped brackets to said tractor, and releasably joining said vertical supports to each of said L-shaped brackets.

11. A method as defined in claim 10, wherein said step of fixedly mounting said L-shaped brackets, comprises the step of joining each of said L-shaped brackets with a portion of an undercarriage of a seat of said lawn tractor.

12. A method as defined in claim 10, wherein said step of releasably joining said vertical supports to said L-shaped supports, consists of joining said vertical supports to said L-shaped supports in a mating sleeve and rod arrangement.

13. A method as defined in claim 12, wherein said step of releasably mounting said frame to said tractor, consists of providing with said L-shaped brackets a retractable hook means, positioning each of said L-shaped brackets on a wheel cowling of said tractor, engaging a portion of said tractor with said hook means, and retracting said hook means thereby attaching said L-shaped brackets to said tractor.

* * * * *